June 3, 1958 M. M. RHODES ET AL 2,837,339

PHONOGRAPH PICKUP

Filed March 6, 1953 2 Sheets-Sheet 1

Inventor
Mordy M. Rhodes
Chester L. Puda
by Norman Lettvin Atty.

June 3, 1958 M. M. RHODES ET AL 2,837,339

PHONOGRAPH PICKUP

Filed March 6, 1953 2 Sheets-Sheet 2

Inventors
Mordy M. Rhodes
Chester K. Puda
by Norman Lettvin
Atty.

2,837,339

PHONOGRAPH PICKUP

Mordy M. Rhodes, Chicago, Ill., and Chester K. Puda, Sheridan, Wyo.

Application March 6, 1953, Serial No. 340,702

12 Claims. (Cl. 274—23)

This invention relates to a phonograph pickup and more particularly to a device for moving a phonograph stylus along a radius of the turntable which supports the record and for maintaining the phonograph stylus tangent to the record grooves at different radii.

The problem of keeping a phonograph stylus tangent to the record grooves at different radii has been one of the serious problems of phonograph manufacturers for years. The failure of a phonograph stylus to move tangent to all the record grooves at different radii is known as "tracking error." For many years the most serious effect of tracking error was undue wear of the phonograph record. When steel needles are used, the tip of the steel needle loses its spherical shape after a few revolutions of the turntable and is ground to the form of a wedge, with its long axis lying along the groove. If the pickup and needle carried thereby then turns with respect to the groove due to a change of tracking angle the needle tip is re-ground and abrasion of the groove walls is increased.

The jewel stylus, being harder than steel, tends to better resist such grinding to wedge form, and, therefore, retains the spherical form of its tip longer. The turning of a spherical tip in the groove does much less harm. Even then, it is well to point out that although it takes longer, even the jewel stylus eventually becomes wedge shaped and then it is much more dangerous than the steel wedge because it is harder and may cause more damage to the walls of the groove. In line with the latter remarks, if the jewel stylus becomes chipped or jagged by some accident, irreparable damage will be caused to the phonograph records—even more than would occur with softer needles.

But the problem of excessive wear is not the most important problem resulting from tracking error. The primary result of tracking error in modern equipment is that the vibration axis of the pickup is turned from the groove, resulting in sound distortion and generation of noise. If the line from the stylus to the pivot axis of the pickup arm is at an angle to the groove tangent, the stylus is also pressed against one groove wall more than the other. Extreme angles will cause an increase in record wear, as pointed out above. In addition, extreme angles may cause the stylus to jump over the walls of the groove. These effects were not noticeable on older phonographs because pickups and pickup arms were quite heavy and tracking distortion was relatively small compared to other types of distortion. However, in the present pickups where the stylus pressure is very low, these effects are magnified and become serious problems.

For a complete discussion of the problems involved with tracking error and variation in tracking angle, reference is had to the published technical articles of Edgar M. Villchur, "Pickup tracking error," Audio Engineering, March 1952, p. 17 and B. B. Bauer, "Tracking angle in phonograph pickups," Electronics, March 1945, and the tracking error problems discussed therein are hereby expressly referred to and made a part of the disclosure herein of the problems sought to be solved by our invention.

It will be seen from a study of the above articles that, as yet, there has not been devised any device which solves the problem of tracking error. Further, it will be seen that resort must be had to the solution of a number of complicated equations to approximate the optimum location of the pivot axis of a pickup arm and the optimum offset angle, and even then the error exists.

Attempts have been made to provide a pickup arm which maintains the path of the stylus along a radius of the turntable, such as in the patents to Swing 1,349,636, Mueller 2,025,300 and Coppleman 2,522,997. But all of these devices resort to the use of a stylus or needle which is pivotable about an axis parallel to the plane through which the pickup arm is swung, and this causes variation in the angle between the needle and the plane of the turntable and in the angle between any geometrical plane passing through the axis of the stylus and the plane of the turntable, with consequent distortion.

Thus, one of the objects of this invention is to provide a phonograph pickup wherein there is substantially no tracking error and the problems occasioned by tracking error are substantially eliminated.

Another object of this invention is to provide a phonograph pickup wherein the stylus is caused to move along the radius of a turntable without any variation in the angle between the stylus and the turntable.

A further object of this invention is to provide a phonograph pickup wherein the stylus is caused to move along the radius of a turntable without any variation in the angle between the stylus and the turntable, and without any variation of the angle between a geometrical plane extending through the axis of the stylus and the plane of the turntable.

Still another object of this invention is to provide a phonograph pickup wherein the stylus is maintained tangent to the record grooves at all radii.

Still a further object of this invention is to provide a phonograph pickup wherein the above objects are accomplished and which pickup is characterized by its simplicity and inexpensiveness of construction.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which.

Figure 1:
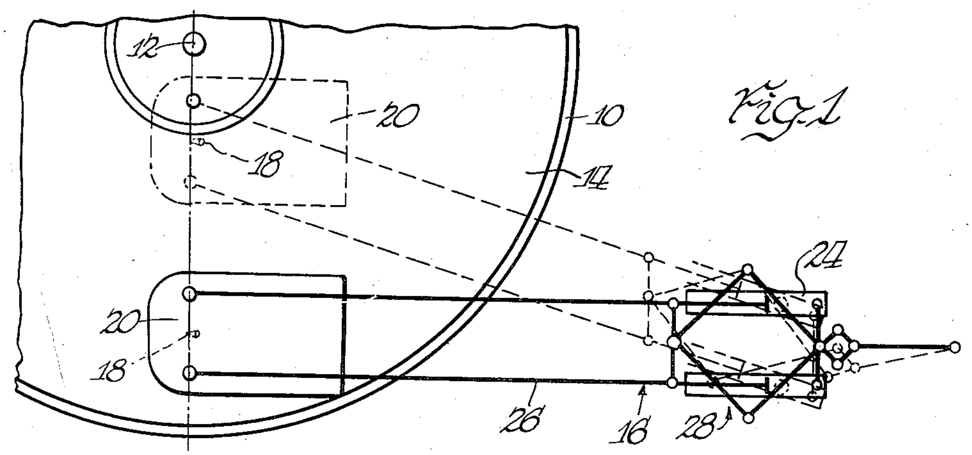
Figure 1 is a semi-diagrammatic plan view of a record turntable and of the novel phonograph pickup mounted adjacent thereto, and illustrating a control means for varying the effective length of the pickup arm as the pickup arm is pivoted.

Referring now to the drawings, there is shown in Figure 1 a phonograph record turntable 10 rotatable on spindle 12 having a phonograph record 14 thereon. A phonograph pickup generally indicated at 16 is mounted adjacent the turntable 10. The pickup 16 includes a phonograph needle or stylus 18 secured to a pickup cartridge 20 pivotally supported from the pickup. The details of pickup cartridge 20, are similar to those of pickup cartridges presently manufactured, and for the purposes of describing this invention, will be referred to generally. The needle 18 is fixed on the cartridge 20 so that it extends therefrom at a fixed angle.

The pickup arm comprises a pivotally mounted section 24, an extensible section 26, and an expansion means 28 for moving the extensible section 26 radially with respect to the pivotally mounted section 24, whereby the stylus 18 may be caused to move along a straight line, preferably the radius of turntable 10.

The details of the pickup arm are most clearly shown in Figures 4 and 5 and will be described hereinafter. For the present, it is more explanatory to consider the modified forms shown in Figures 2 and 3 which in themselves, represent components or simplified constructions of the apparatus shown in Figures 1, 4 and 5.

Figures 2, 3:
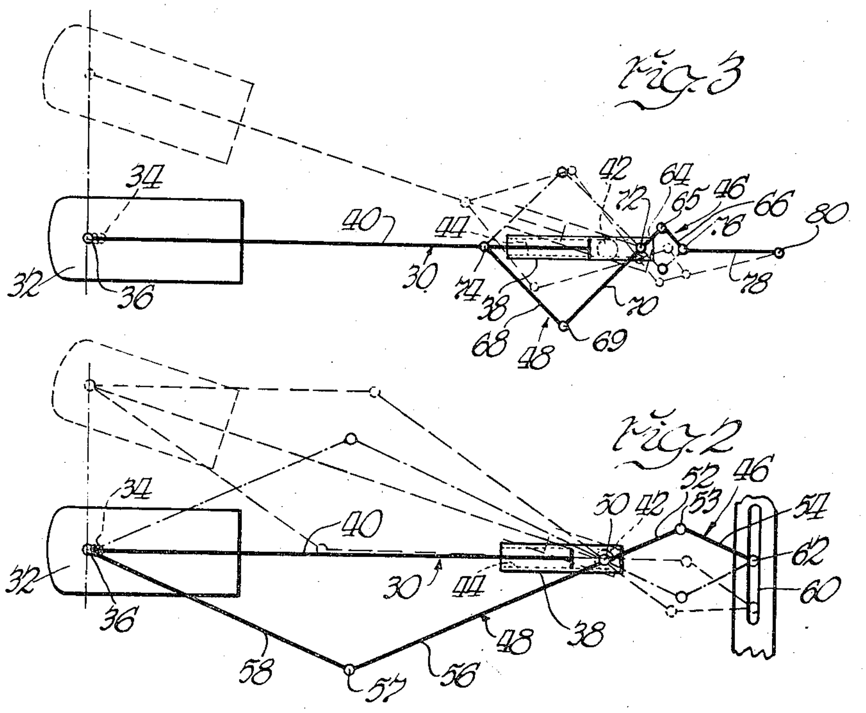
Figure 2 is a semi-diagrammatic plan view of a modified form of the novel phonograph pickup arm, wherein the stylus is adapted to be moved along a straight line by a modified form of the control means for varying the effective length of the pickup arm as the pickup arm is pivoted.
Figure 3 is a semi-diagrammatic plan view of still another modified form of the novel phonograph pickup arm, wherein the stylus is adapted to be moved along a straight line by still another modified form of the control means for varying the effective length of the pickup arm as the pickup arm is pivoted.

In the form of the phonograph pickup arm shown in Figure 2, the pickup is generally indicated at 30 and includes a pickup cartridge 32 having a needle or stylus 34 extending therefrom at a fixed angle. The cartridge 32 is mounted on pin 36 at one end of the pickup arm. The axis of pin 36 is located in line with, and extends vertically above, the tip of needle 34. The pickup arm itself comprises a pivotally mounted arm-segment 38 and a telescoping arm-segment 40. The pivotally mounted arm-segment 38 is pivotable about the axis of a mounting pin 42, which mounting pin is adapted to be positioned with respect to the turntable at a location hereinafter described. The arm-segment 40 is slidably positioned in bore 44 in arm-segment 38 and is extensibly and retractably movable radially with respect to the axis of pivot pin 42.

A proportional expansion means is provided for maintaining the path of movement of the needle or stylus 34 along a straight line, which straight line may be the radius of the turntable, if desired. Any form of proportional expansion means may be utilized. The type of expansion means shown employs a control linkage generally indicated at 46 and a follower linkage indicated at 48. The control linkage 46 and the follower linkage 48 have a common pivot point 50 located at the axis of pivot pin 42. The control linkage has a pair of equal length legs 52 and 54 which are pivoted together at 53, and which legs serve as legs of an isosceles triangle, the base of which extends from the common pivot point 50 to the extended end of leg 54, which is adapted to be constrained along a predetermined path.

The follower linkage 48 includes legs 56 and 58 pivoted together at 57, which legs serve as legs of an isosceles triangle whose base extends from the axis of pivot pin 42 to the axis of pin 36 located vertically above the tip of needle 34.

The restraint of the control linkage 46 to a predetermined path includes a groove or slot 60 fixed with respect to the axis of pivot pin 42 and disposed parallel to the path over which the tip of needle 34 is to be moved; and a pin 62 at the extended end of leg 54 adapted to enter and move along the length of slot 60 as the pickup arm is pivoted about the axis of pin 42. If desired, the legs of the linkages may be duplicated as shown in dash lines, so as to form a rhombus-type control and follower expansion linkages.

Now, the tip of needle 34 in Figure 2 is to be moved in a straight line parallel to slot 60. By positioning slot 60 adjacent the turntable so that it is parallel to the radius of the turntable, the needle 34 will be caused to move parallel to the radius of the turntable. The pickup arm is made of such a length and is so positioned that the distance from the axis of pivot pin 42 to the tip of needle 34 is a minimum when the longitudinal axis of the pickup arm is perpendicular to the radius of the turntable along which the needle 34 is adapted to move; and further, the pivot pin 42 is so located that the needle 34 moves along the radius of the turntable 10. Thus, means have been provided for moving the needle 34 along a radius of a turntable.

The mechanism thus far described does not, itself, provide positive means for maintaining any geomertical plane which passes through the axis of needle 34 at the same geometrical attitude with respect to the plane of the turntable as the stylus moves along the radius of the turntable. However, if cartridge 32 is pivotally mounted on pin 36, the forces which are applied to the needle 34 by the walls of the groove on the phonograph record may be sufficient to pivot the cartridge 36 as the pickup arm pivots about pin 42 so that the desired geometrical attitude is maintained. As previously pointed out above, if the tip of the needle does not become re-ground and if the needle is spherical or conical, failure of the cartridge 34 to pivot about pin 36 is not too serious, although in the ultimate development, and for best results, it is desirable that such movement take place.

The device in Figure 2 is completely operable but it would be desirable to reduce the size of the expansion linkages because if the follower linkage extends the full length of the arm, it becomes too long and cumbersome. When the linkages are shortened and the extended end of the follower linkage is connected to the extensible arm-segment at a point between the pivot point of the pickup arm and the tip of the stylus, the path of the extended end of the control linkage which previously was moved along the groove 60, no longer will follow a path parallel to the radius of the turntable. To determine the path which the extended end of the control linkage must be constrained to, in order that the needle be moved along a path parallel to the radius of the turntable, it is necessary to make a layout in which the needle is moved along a straight line and then observe the path which the extended end of the control linkage takes.

In following such a procedure, it was found that the extended end of the control linkage, which is to be constrained to a predetermined path, followed a non-linear path which appeared to approximate a probability curve of the general equation $y=e^{x^2}$, and that the portion of the probability curve over which the extended end of the control linkage swung was the apex or "humped" portion of the probability curve.

In order to maintain the extended end of the control linkage along a predetermined path which would maintain the extended end of the follower linkage following along the radius of a turntable, it would only be necessary to cut a control slot in the predetermined shape which brings about such movement, and to position a pin from the extended end of the control linkage in said slot in the manner shown in Figure 2. However, it was desired to take advantage of the fact that an arc of a circle serves as an excellent approximation of the apex or "humped" portion of the probability curve. Then, if the extended end of the control linkage is secured to an arm which represented the radius of the approximating circle whose arc is an approximation of the portion of the probability curve desired, another means of maintaining the extended end of the control linkage along a predetermined path would be available.

However, when the common pivot point between the control linkage and the follower linkage is located at the axis of the pivot pin about which the pickup arm is swung, the radius of curvature of the approximating arc is relatively small. It was then found that by moving the common pivot point of the control and the follower linkages rearwardly of the axis about which the pickup arm is swung, that the radius of curvature of the approximating arc of the probability curve could be increased. It is desirable that the radius of curvature of the approximating arc be increased because a better approximation to the probability curve may be obtained by using arcs of circles of larger radii; and also the central angle of the approximating arc becomes much smaller; and still further, binding forces at the pivot connection between an arm representing the radius of an approximating circle and the extended end of the control linkage are kept as low as possible.

The device shown in Figure 3 is constructed in accordance with these discoveries, and accomplishes the same results as the device shown in Figure 2. In Figure 3, the control linkage comprises legs 64 and 66 pivoted together at 65. The follower linkage comprises legs 68 and 70 pivoted together at 69. The control linkage and follower linkage have a common pivot pin at 72, which is positioned on and swingable with pivotable arm-segment 38. The extended end of the follower linkage is pivotally connected at 74 to the extensible arm-segment 40 at a point between the end of pivotable arm-segment 38 and the stylus 34. The extended end of the control linkage is pivotally connected at 76 to an arm 78. The arm 78 is of length equal to the radius of curvature of an approximating arc of the path over which the extended end of the control linkage is to be constrained and is mounted to pivot about an axis or center 80 which is fixed in position with respect to the axis of pivot pin 42 about which the pickup is pivoted. It has been found that with the type of apparatus shown in Figure 3, that when the pickup arm is pivoted about the axis of pin 42, the path of the tip of needle 34 is maintained substantially in a straight line. And by proper positioning of the pickup with respect to the turntable, the needle 34 is caused to move along a radius of the turntable.

As has been pointed out earlier in the description, the apparatus in Figure 2 does not, itself, provide positive means for maintaining any geometrical plane which passes through the axis of needle 34 at the same geometrical attitude with respect to the plane of the turntable as the stylus moves along the radius of the turntable. Furthermore, for best results, it is desirable that some positive means be provided to accomplish this end—namely, to maintain any and every geometrical plane which passes through the axis of needle 34 at the same geometrical attitude with respect to the plane of the turntable as the stylus moves along the radius of the turntable. This desired end is accomplished by the use of the apparatus shown in Figures 1, 4 and 5.

It will be understood that if one plane maintains the desired relationship upon the swinging of the pickup arm about its pivotal mounting, then all planes will maintain the desired relationship. In the particular apparatus shown in Figures 4 and 5, it was decided to maintain a straight line on the phonograph pickup parallel to the straight line over which the point of the needle moves as the arm is swung about its pivotal mounting. The tip of the needle and this straight line determine a plane, and since the straight line and the tip of the needle move over parallel paths, that plane maintains the required geometrical attitude with respect to the plane of the turntable as the needle moves along the radius of the turntable. Of course, this analysis is based on the assumption that the phonograph pickup is swung through a plane and, therefore, neglects the minor movements of the pickup arm above and below the horizontal plane through which the pickup is swung.

To provide such a straight line on the phonograph pickup, the pickup arm is divided longitudinally into two spaced segments and the cartridge is pivotally connected to both longitudinal segments of the pickup arm; the geometrical line between the two pivot points defining the required straight line.

Figures 4, 5:
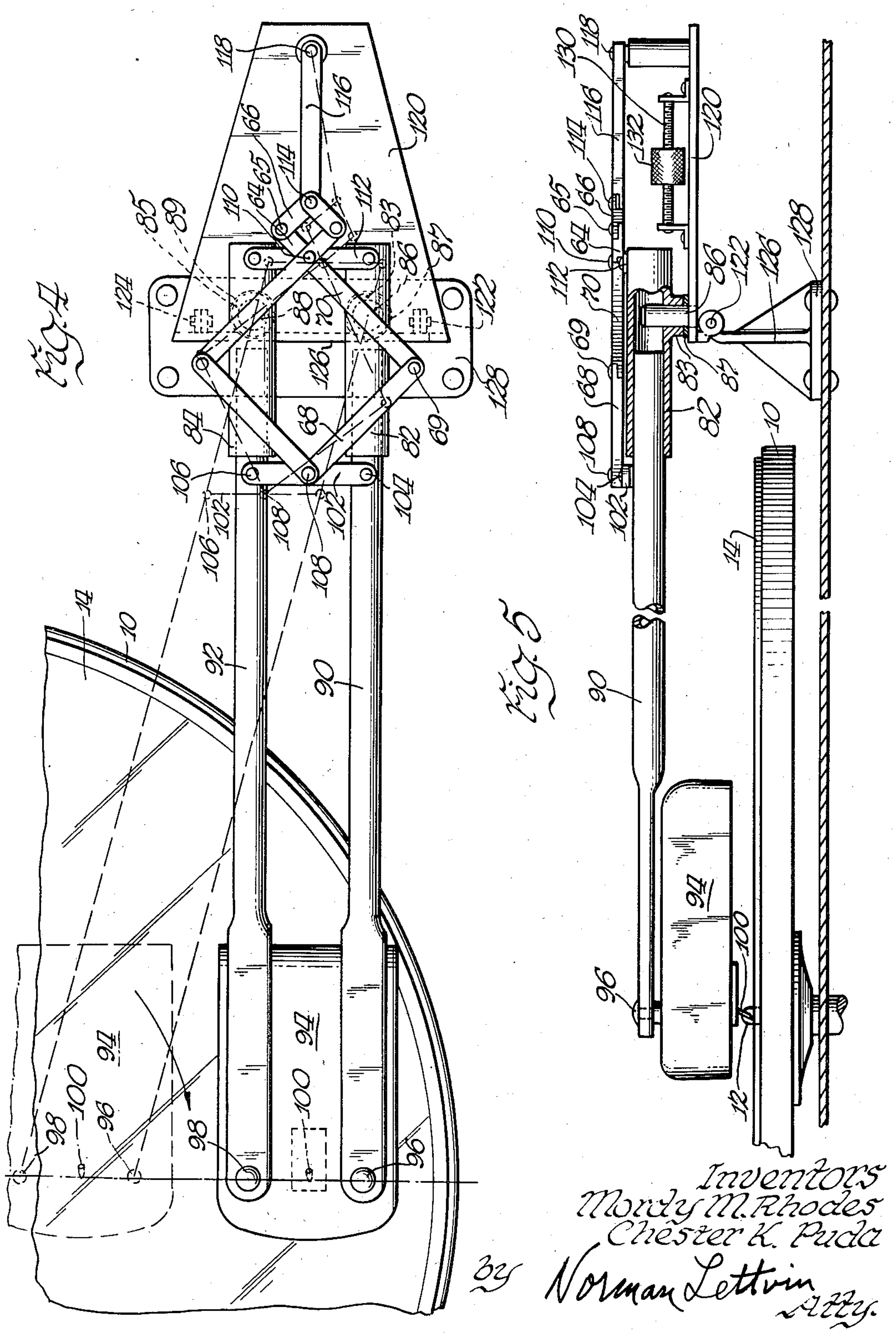
Figure 4 is an enlarged plan view of the phonograph pickup illustrated in Figure 1.
Figure 5 is a side elevation view of the phonograph pickup shown in Figure 4.

Referring now to Figures 4 and 5, the phonograph pickup comprises a pair of parallel pivotable arm segments 82 and 84 respectively having sleeves 83 and 85 slidably fitted over mounting stubs or pins 86 and 88, for pivoting of arm segments 82 and 84 about the axes of pins 86 and 88. Pins 86 and 88 are provided with shoulders 87 and 89 which limit the entrance of pins 86 and 88 into sleeves 83 and 85. The axes of the mounting pins 86 and 88 are positioned in a plane parallel to the radius of the turntable along which the point of the needle is adapted to be moved. The arm-segments 82 and 84 are tubular and have slidably mounted therein a pair of parallel extensible arm-segments 90 and 92. A pickup cartridge 94 is pivotally mounted on pins 96 and 98 supported at the extended ends of arm-segments 90 and 92. A phonograph needle 100 extends from the cartridge 94 at a fixed angle thereto. The axes of pins 96 and 98 are located in a plane with the tip of needle 100.

A rigid link 102 is pivotally connected by pins 104 and 106 to the arm-segments 90 and 92, and the link 102 lies parallel to the plane through the axes of pins 96 and 98. The axes of pins 96, 98, 104 and 106 form the corners of a parallelogram. Furthermore, the axes of pins 86, 88, 104 and 106 form the corners of a second parallelogram. Since the line between the axes of pins 88 and 86 is fixed and remains parallel to the radius of the turntable over which the point of the needle 100 passes at all positions of the pickup arm, then the plane through the axes of pins 96, and 98, and the plane through the axes of pins 104 and 106, remain parallel to the radius of the turntable at all positions of the pickup arm.

Furthermore, the movement of the tip of needle 100, which lies in the plane defined by the axes of pins 96 and 98 is maintained along the radius of the turntable by means of an expansion linkage of the type shown in Figure 3. In Figures 4 and 5, the expansion linkage is adapted to the modified form of the pickup arm shown therein. The adaptation consists of pivotally securing the extended end 108 of the follower linkage to link 102, which link is secured to the extensible arm segments 90 and 92, and by pivotally securing the common pivot point 110 to a link 112 which is pivotally secured to the pivotable arm-segments 82 and 84. The extended end 114 of the control linkage is pivotally secured to a radius arm 116 which is pivoted about a center pin 118; the center pin 118 being fixed relative to the pivot pins 86 and 88.

The entire apparatus described above is mounted on a base plate 120, as shown in Figures 4 and 5. The base plate 120, itself, is pivotable about hinge pins 122 and 124 which permits swinging of the pickup upwardly and downwardly, toward and away from the turntable. The axes of hinge pins 122 and 124 lie parallel to the radius of the turntable along which the tip of needle 100 is adapted to move. The hinge pins 122 and 124 are supported on a bracket 126 provided with a mounting flange 128, which mounting flange is adapted to be secured to any appropriate rigid structure, such as the structure which houses the turntable drive.

Also mounted on base plate 120 are means for counterweighting the pickup arm so as to provide control of the stylus pressure on the phonograph record. Such counterweighting means may include a threaded rod 130 having a counterweight 132 threaded thereon and movable therealong selectively for the purposes of varying the stylus' pressure. Inasmuch as a portion of the pickup arm is extensible with respect to the pivotal mounting pins 86 and 88, the center of gravity of the pickup arm will vary as the arm is swung and, therefore, the stylus' pressures will vary. By mounting the counterweight in a different manner so that it is slidable on a track toward and away from the pivot mounting of the pickup arm, said slidable counterweight could be actuated by a portion of the expansion linkage which moves in the opposite direction to that direction in which the extensible portion of the pickup arm is moved. And thus, means may also be provided for varying the location of the counterweight as the center of gravity of the pickup arm shifts. This would provide substantially automatic counterweighting compensation and would, of course, be highly desirable.

Thus, it can be seen that there has been provided a wholly novel phonograph pickup wherein the problems of tracking error and the accompanying problems of excessive phonograph record wear and of tone distortion are substantially eliminated.

While there has been shown and described a particular embodiment of this invention, it will be obvious to those skilled in the art that various changes and modifications may be made without departing from the invention and, therefore, it is intended in the appended claims to cover all such changes and modifications as fall within the true spirit and scope of the invention.

What we claim as new, and desire to secure by Letters Patent of the United States, is:

1. A phonograph pickup comprising a pivotally mounted pickup arm adapted to be swung over a surface of a record turntable, a stylus mounted adjacent one end of said arm, means mounting said stylus on said arm so that the angle between the stylus and the plane through which said arm is swung remains constant, and means for maintaining the movement of said stylus substantially along a radius of said turntable, said latter means including said pickup arm and comprising a pivotally mounted first arm-segment, a second arm-segment telescopically supported on said pivotally mounted first arm-segment and extensibly and retractably movable radially with respect to the pivot axis of said pivotally mounted first arm-segment, a mechanical proportional expansion means defining an articulated control linkage and an articulated follower linkage, said follower linkage being pivotally connected to said second arm-segment, and said control linkage being constrained along a predetermined path so that, as the pickup arm is pivoted, the follower causes the stylus to move along a radius of the turntable.

2. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means including said pickup arm and comprising a pivotally mounted first arm-segment, a second arm-segment telescopically supported on said pivotally mounted first arm-segment and extensibly and retractably movable radially with respect to the pivot axis of said pivotally mounted first arm-segment, a mechanical proportional expansion means defining an articulated control linkage and an articulated follower linkage, said control and follower linkages having a common pivot point fixed with respect to said pivotally mounted first arm-segment, said follower linkage being pivotally connected to said second arm-segment, and said control linkage being constrained along a predetermined path as the pickup arm is swung, whereby the stylus is caused to move substantially along a radius of the turntable.

3. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means including said pickup arm and comprising a pivotally mounted first arm-segment, a second arm-segment telescopically supported on said pivotally mounted first arm-segment and extensibly and retractably movable radially with respect to the pivot axis of said pivotally mounted first arm-segment, a mechanical proportional expansion means defining an articulated control linkage and an articulated follower linkage, said control and follower linkages having a common pivot point fixed with respect to said pivotally mounted first arm-segment and positioned so that the pivot point of said pickup arm is located between the stylus and said common pivot point, said follower linkage being pivotally connected to said second arm-segment, and said control linkage being constrained along a predetermined path as the pickup arm is swung, whereby the stylus is caused to move substantially along a radius of the turntable.

4. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means including said pickup arm and comprising a pivotally mounted first arm-segment, a second arm-segment telescopically supported on said pivotally mounted first arm-segment and extensibly and retractably movable radially with respect to the pivot axis of said pivotally mounted first arm-segment, a mechanical proportional expansion means defining an articulated control linkage and an articulated follower linkage, said control and follower linkages having a common pivot point fixed with respect to said pivotally mounted first arm-segment, said follower linkage being pivotally connected to said second arm-segment, and said control linkage having a portion constrained by means of a link pivotally connected at one end to said control linkage and at its other end to a member fixed with respect to the point about which the phonograph arm is swung, whereby the stylus is caused to move substantially along a radius of the turntable.

5. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means including said pickup arm and comprising a pivotally mounted first arm-segment, a second arm-segment telescopically supported on said pivotally mounted first arm-segment and extensibly and retractably movable radially with respect to the pivot axis of said pivotally mounted first arm-segment, a mechanical proportional expansion means defining an articulated control linkage and an articulated follower linkage, said control and follower linkages having a common pivot point fixed with respect to said pivotally mounted first arm-segment, said follower linkage being pivotally connected to said second arm-segment, and said control linkage having a portion constrained by means of a link pivotally connected at one end to said control linkage and at its other end to a member fixed with respect to the point about which the phonograph arm is swung, whereby the stylus is caused to move substantially along a radius of the turntable, the path to which said control linkage is constrained being the arc of a circle of which said link is a radius with the center of said circle located at said other end of the link, and said arc of a circle to which said portion of the control linkage is constrained being an approximation of a portion of a curve along which said portion the control linkage must pass in order that the stylus be moved substantially along a radius of the turntable.

6. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means comprising a pivotally mounted arm-segment, a second arm-segment supported by said pivotally mounted arm-segment and extensibly and retractably movable radially with respect to the pivot axis of said pivotally mounted arm-segment, a mechanical proportional expansion means defining a control linkage and a follower linkage, said control and follower linkages having a common pivot point fixed with respect to said pivotally mounted arm-segment, said follower linkage being pivotally connected to said second arm-segment, and said control linkage being constrained in a predetermined path as the phonograph arm is swung, whereby the stylus is caused to move substantially along a radius of the turntable, said common pivot point being located at the point along the length of said arm about which the arm pivots, said follower linkage being pivotally connected to said second arm-segment at a point along the length of said second arm above the tip of said stylus, and a portion of said control linkage being constrained along a straight path parallel to the turntable radius along which the stylus is adapted to move.

7. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means comprising a pivotally mounted arm-segment, a second arm-segment supported by said pivotally mounted arm-segment and extensibly and retractably movable radially with respect to the pivot axis of said pivotally mounted arm-segment, a mechanical proportional expansion means defining a control linkage and a follower linkage, said control and follower linkages having a common pivot point fixed with respect to said pivotally mounted arm-segment, said follower linkage being pivotally connected to said second arm-segment, and said control linkage being constrained in a predetermined path as the phonograph arm is swung, whereby the stylus is caused to move substantially along a radius of the turntable, said common pivot point being located at the point along the length of said arm about which the arm pivots, said follower linkage being pivotally connected to said second arm-segment at a point along the length of said second arm above the tip of said stylus, and a portion of said control linkage being constrained along a straight path parallel to the turntable radius along which the stylus is adapted to move, said control linkage being constrained by means of a pin carried by said linkage and extending into a track on a member fixed relative to the point about which the pickup arm is swung.

8. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means comprising a pivotally mounted arm-segment, a second arm-segment supported by said pivotally mounted arm-segment and extensibly and retractably movable radially with respect to the pivot axis of said pivotally mounted arm-segment, a mechanical proportional expansion means defining a control linkage and a follower linkage, said control and follower linkages having a common pivot point fixed with respect to said pivotally mounted arm-segment, said follower linkage being pivotally connected to said second arm-segment, and said control linkage being constrained in a predetermined path as the phonograph arm is swung, whereby the stylus is caused to move substantially in a straight line along the radius of the turntable, said control linkage having a portion constrained by means of a pin carried thereby and movable along a track on a member fixed with respect to the point about which the pickup arm is swung.

9. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, said latter means comprising a pivotally mounted arm-segment, a second arm-segment supported by said pivotally mounted arm-segment and extensibly and retractably movable radially with respect to the pivot axis of said pivotally mounted arm-segment, a mechanical proportional expansion means defining a control linkage and a follower linkage, said follower linkage being connected to said second arm-segment and said control linkage being constrained along a predetermined path so that, as the arm is pivoted, the follower causes the stylus to move substantially along a radius of the turntable, said pickup arm and linkages being supported on a member which is mounted to pivot about an axis substantially parallel to the turntable, whereby the stylus may be swung toward and away from said turntable, and means on said member for counterweighting the pickup arm.

10. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, and means for maintaining any geometrical plane passing through the axis of said stylus at the same geometrical attitude with respect to the plane of said turntable as the stylus moves along said radius, said pickup arm comprising at least two parallel, longitudinal arm-segments mounted to pivot about axes located in a first plane, a rigid link parallel to said first plane and pivotally connected to said longitudinal segments, and said stylus being pivotally connected to said longitudinal arm-segments about axes located in a second plane parallel to said first plane.

11. A phonograph pickup comprising a pivotally mounted pickup arm adapted to be swung over the surface of a record turntable, a stylus mounted adjacent one end of said arm, means mounting said stylus on said arm so that the angle between the stylus and the plane through which said arm is swung remains constant, means for maintaining the movement of said stylus substantially along a radius of said turntable, and means for maintaining any geometrical plane passing through the axis of said stylus at the same geometrical attitude with respect to the plane of said turntable as the stylus moves along said radius, said last means comprising at least two pivotally mounted parallel first arm-segments mounted to pivot about axes located in a first plane, a pair of second arm-segments telescopically supported by said pivotally mounted first arm-segments and movable radially with respect to said pivot axes of said arm-segments, a rigid link parallel to said plane of the pivot axes and pivotally connected to said second pair of arm-segments, and said stylus being pivotally connected to said second arm-segments about axes which are located in a second plane parallel to said first plane.

12. In combination, an instrument, support means carrying said instrument and being mounted for pivotal movement about a fixed axis, said support means comprising a pivotally mounted elongated first arm-segment, a second arm-segment carrying said instrument thereon and being mounted on said first arm-segment for telescopic movement longitudinally thereof, an expansion means including an articulated control and an articulated follower, said follower being connected to said second arm-segment, and means operatively associated with said control for varying the control as the first arm-segment is pivoted, so that said follower causes the instrument to move along a straight line spaced from said fixed axis.

References Cited in the file of this patent

UNITED STATES PATENTS

| | | |
|---|---|---|
| 1,391,797 | Scrabic | Sept. 27, 1921 |
| 1,933,400 | Victor | Oct. 31, 1933 |
| 2,455,529 | Shortt | Dec. 7, 1948 |
| 2,522,997 | Coppleman | Sept. 19, 1950 |

FOREIGN PATENTS

| | | |
|---|---|---|
| 715,971 | France | Dec. 12, 1931 |